(12) United States Patent
Park et al.

(10) Patent No.: US 8,073,508 B2
(45) Date of Patent: Dec. 6, 2011

(54) SLIDE MODULE AND MOBILE TERMINAL HAVING THE SAME

(75) Inventors: Byung-Duck Park, Gyeonggi-Do (KR); Keum-Chul Kim, Gyeonggi-Do (KR); Hun Heo, Seoul (KR)

(73) Assignee: LG Electronics Inc., Seoul (KR)

( * ) Notice: Subject to any disclaimer, the term of this patent is extended or adjusted under 35 U.S.C. 154(b) by 737 days.

(21) Appl. No.: 11/456,504

(22) Filed: Jul. 10, 2006

(65) Prior Publication Data

US 2007/0006421 A1 Jan. 11, 2007

(30) Foreign Application Priority Data

Jul. 9, 2005 (KR) .................... 10-2005-0061965
Nov. 4, 2005 (KR) .................... 10-2005-0105641

(51) Int. Cl.
*H04M 1/00* (2006.01)
*H04M 9/00* (2006.01)
*G06F 1/16* (2006.01)
*H05K 5/00* (2006.01)
*H05K 7/00* (2006.01)

(52) U.S. Cl. ............. 455/575.4; 455/575.1; 379/428.01; 379/433.01; 379/433.12; 361/679.39

(58) Field of Classification Search ............... 455/575.1, 455/575.4; 361/679.01–679.02, 679.09, 361/679.39, 679.55, 679.56; 379/428.01, 379/433.01, 433.12
See application file for complete search history.

(56) References Cited

U.S. PATENT DOCUMENTS

| 6,119,019 | A  | * | 9/2000 | Phelps ........................ 455/575.3 |
| 6,389,302 | B1 | * | 5/2002 | Vance ............................ 455/567 |
| 6,712,512 | B2 | * | 3/2004 | Teramach et al. ............... 384/45 |
| 6,782,242 | B1 | * | 8/2004 | Koleda et al. ................ 455/90.3 |
| 7,181,257 | B2 | * | 2/2007 | Gordecki .................... 455/575.4 |
| 2004/0190182 | A1 |   | 9/2004 | Kitamura et al. |
| 2005/0000059 | A1 |   | 1/2005 | Sung et al. |
| 2005/0113154 | A1 | * | 5/2005 | Park et al. .................. 455/575.4 |
| 2005/0119034 | A1 |   | 6/2005 | Kato et al. |
| 2005/0277449 | A1 |   | 12/2005 | Wu |
| 2006/0025184 | A1 | * | 2/2006 | Cho et al. ................... 455/575.4 |
| 2006/0073859 | A1 | * | 4/2006 | Chou ......................... 455/575.4 |

FOREIGN PATENT DOCUMENTS

| CN | 1503541 | 6/2004 |
| DE | 1779251 | 12/1958 |
| EP | 0978979 | 2/2000 |
| EP | 1075125 | 2/2001 |

(Continued)

*Primary Examiner* — George Eng
*Assistant Examiner* — Wesley Kim
(74) *Attorney, Agent, or Firm* — Lee, Hong, Degerman, Kang & Waimey

(57) ABSTRACT

A slide module includes a base, at least one rail receiving part is formed; a slider includes at least one rail part slidably and facing the base; and a friction reducing unit formed on at least one of the base and the slider to reduce friction generated when the slider is slidably moved over the base. The sliding operation can be more smoothly and silently performed.

49 Claims, 8 Drawing Sheets

FOREIGN PATENT DOCUMENTS

| | | |
|---|---|---|
| EP | 1422911 | 5/2004 |
| EP | 1496674 | 1/2005 |
| EP | 1501260 | 1/2005 |
| JP | 63-091872 | 6/1988 |
| JP | 63-130975 | 8/1988 |
| JP | 1188870 | 7/1989 |
| JP | 03-265726 | 11/1991 |
| JP | 09-245458 | 9/1997 |
| JP | 11-328922 | 11/1999 |
| JP | 2003179678 | 6/2003 |
| JP | 2004-253480 | 9/2004 |
| JP | 3114193 | 8/2005 |
| JP | 2006217594 | 8/2006 |
| KR | 10-0453644 | 10/2004 |

\* cited by examiner

SLIDE MODULE AND MOBILE TERMINAL HAVING THE SAME

CROSS-REFERENCE TO RELATED APPLICATIONS

Pursuant to 35 U.S.C. §119(a), this application claims the benefit of earlier filing date and right of priority to Korean Application Nos. 61965/2005, filed on Jul. 9, 2005 and 105641/2005, filed on Nov. 4, 2005, the contents of which is hereby incorporated by reference herein in its entirety.

BACKGROUND OF THE INVENTION

1. Field of the Invention

The present invention relates to a mobile terminal having a slide module and, more particularly, to a slide module capable of implementing a smooth and silent sliding operation between elements, which would cause undesired friction according to a sliding operation of the slide module, by reducing friction therebetween.

2. Description of the Related Art

In general, mobile terminals are portable wireless communication devices and can be classified variably according to its type. For example, the mobile terminals can be divided into a bar type terminal formed as one body, a folder type terminal whose folder part is rotatably connected over a main body part, a slide type mobile terminal whose slider part is slidably moved up and down over the main body part, and a swinging type mobile terminal whose two swing parts are rotated in a facing manner.

In the mobile terminals, a module (rotation module or a slide module or a swing module, etc.) for allowing a relative rotation or sliding or swing movement between two or more bodies guarantees a mechanical position changing (rotating or sliding or swing, etc.) of the mobile terminals according to a user manipulation. Here, the rotation module makes one body rotate about another body. The sliding module enables one body slide over another body with facing each other and the swing module enables one body swing around another body with facing each other, too.

If the module is not smoothly operated during the position changing process, a noise or friction would be inevitably generated, making users uncomfortable and not satisfied in using the mobile terminals.

Thus, demands for a module that can be smoothly and silently operated for a position changing and a mobile terminal having such a module are increasing.

BRIEF DESCRIPTION OF THE INVENTION

One exemplary feature of the present invention is to provide a slide module for implementing a smooth and silent sliding operation by reducing friction between elements of the slide module when the slide module is slidably moved.

Another exemplary feature of the present invention is to provide a mobile terminal having a slide module capable of smoothly and silently performing a position changing operation according to a slidable movement of the mobile terminal through a firm coupling between the slide module and the mobile terminal.

To implement at least the above feature in whole or in parts, a slide module according to one aspect of the present invention includes a base, a slider and a friction reducing unit.

At least one, preferably two rail receiving parts are formed in a sliding or lengthwise direction at both sides of the base. The slider includes at least one, preferably two rail parts at both sides thereof, which is slidably inserted in the rail receiving part. Accordingly, the slider can slidably moved along the lengthwise direction in a state of facing the base. The friction reducing unit is formed on at least one of the base and the slider. The friction reducing unit reduces friction generated when the slider is slidably moved with respect to the base. Accordingly, a failure factor according to friction generated when the slider is relatively slid can be removed, making the sliding movement smooth and silent, and thus, noise according to the sliding operation can be reduced.

In a slide module according to one embodiment of the present invention, the friction reducing unit is a friction reducing coating layer formed by coating a lubricant material. The friction reducing coating layer is formed on at least one surface of the base and the slider, and preferably, formed by coating silicon. The silicon coating layer lessens friction between the base and the slider that collide with each other during the sliding operation and elements additionally installed there between.

In a slide module according to another embodiment of the present invention, the friction reducing unit is a friction reducing member that is mounted on the rail receiving part and lessens direct friction between the rail part and the rail receiving part. In this case, the friction reducing member should have durability to endure friction as well as lessening friction between the rail part and the rail receiving part. Accordingly, the friction reducing member is preferably formed of engineering plastic with excellent mechanical strength as well as lubrication.

In order to couple the friction reducing member to the rail receiving part, a coupling protrusion is formed at the friction reducing unit and a protrusion receiving recess in which the coupling protrusion is inserted can be formed at the rail receiving part. In addition, the friction reducing member is not formed as a separate member so as to be coupled with the rail receiving part but can be integrally fabricated by being dually injection-molded together with the rail receiving part.

An end portion buffering member can be additionally mounted at both end portions in a lengthwise direction of the friction reducing member. The end portion buffering member is made of rubber or urethane with better impact absorption characteristics than the friction reducing member in order to buffer an impact generated when the slider collides with a different element as it stops sliding. Herein, the different element is a member at which the slide module is installed.

In a slide module according to a still another embodiment of the present invention, the base and the slide are respectively made of materials each having a different friction coefficient. As the two members each having a different friction coefficient, friction therebetween can be lower than a case where they are made of the same material. In other words, in this embodiment of the present invention, the friction reducing unit is not separately provided, but the base and the slide module perform the function of the friction reducing unit by virtue of their material itself.

In the slide module according to yet another embodiment of the present invention, an elastic force providing unit is additionally provided to provide elastic force to the slide module during the sliding operation. The elastic force providing unit includes a spring of a wire form installed between the base and the slide module. A friction reducing coating layer for lessening friction caused by contact between the base and the slider can be formed on the surface of the spring.

The spring includes at least two or more wound portions. With the two or more wound portions formed, power according to elastic compression of the spring cannot be concentrated into only to one portion, so the wound portions can work without going beyond their originally disposed planar position. Accordingly, a degree of friction of the spring with respect to the base and the slider can be lowered, which leads to increase in silence and smoothness of the sliding of the slider.

In the case where the wound portions of the spring is not wound two or more times but wound only one time, the spring can be positioned on almost the same plane centering on the wound portions. Compared with a wound portion wound two or more times, the wound portion wound only one time is thin in the direction perpendicular to the plane formed by the spring and has small fluctuation in the direction. Accordingly, the spring with the wound portion which is wound only one time has a reduced degree of friction with the base and the slider, guaranteeing a smooth and silent sliding operation of the slide module. With the spring wound only one time, the thickness can be reduced to make the slide module entirely slim.

In addition, the elastic force providing unit can be arranged as one pair facing each other to make a balance in applying an elastic force, further reducing friction and guaranteeing more stable sliding.

A mobile terminal having the slide module according to another aspect of the present invention includes a first body, a second body, and a slide module installed between the first and second bodies and slidably moving the second body over the first body.

The slide module is a slide module according to one aspect of the present invention as described above.

In addition to the slide module, a mobile terminal according to still another aspect of the present invention may further include a fixing part for firmly fixing the slider to the second body to basically lessen a movement of the slider and corresponding friction during the sliding operation.

In the mobile terminal according to one embodiment of the present invention, the fixing part includes a fixing recess formed at one of the slider and the second body and a fixing protrusion formed at the other of the slider and the second body so as to be inserted in the fixing recess. The fixing protrusion is coupled in the fixing recess according to a snap-fit method, whereby it can simply provide a certain level of fixing force before the slider is finally fixed to the second body by using a screw, etc.

In the mobile terminal according to another embodiment of the present invention, the fixing part includes a first fastening unit coupled from the slider side to the second body side and a second fastening unit fastened in the opposite direction. In other words, the slider is fastened to the second body in both directions, so the fastening force can be strengthened. Accordingly, the slide can be more firmly coupled with the second body, and thus, a movement that may be caused by an incomplete coupling and corresponding friction can be basically reduced.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

A slide module and a mobile terminal having the same according to preferred embodiments of the present invention will be described in detail with reference to the accompanying drawings.

Figure 1:
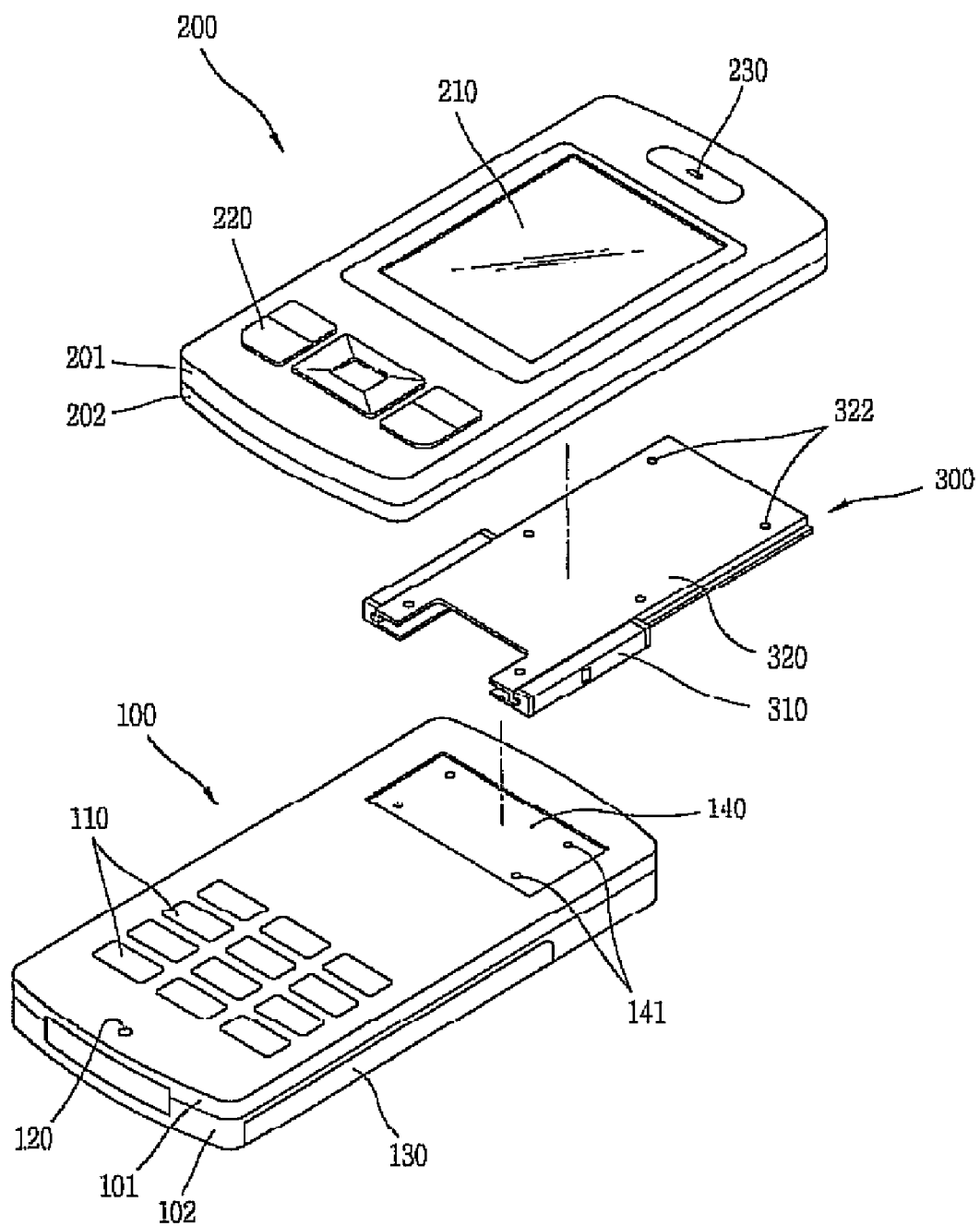
FIG. 1 is an exploded perspective view of a mobile terminal having a slide module according to one embodiment of the present invention.

FIG. 1 is an exploded perspective view of a mobile terminal having a slide module according to one embodiment of the present invention.

As shown in FIG. 1, the mobile terminal according one embodiment of the present invention includes a first body 100, a second body 200, and a slide module 300 for allowing the second body 200 to be relatively slid with respect to the first body 100.

The first body 100 is formed by coupling an upper cover 101 and a lower cover 102 to form an internal space therebetween. A printed circuit board (PCB) (not shown) for electrically controlling each element of the mobile terminal is installed in the internal space. An input unit, such as plurality of key buttons 110 for inputting numbers or characters is arranged at a lower side of a main surface of the upper cover 101. A microphone 120 for inputting a sound is provided at a lower side of the key buttons 110. A battery 130 for supplying power to the mobile terminal is detachably coupled on the lower cover 102. A base installation part 140 is formed on an upper portion of the upper cover 101 and has a height slightly lower than the main surface of the upper cover 101. The base installation part 140 includes at least one or more fastening recesses 141.

The second body 200 is formed by coupling the upper cover 201 and the lower cover 202 with an internal space therebetween. A display module (not shown), etc. such as an LCD (Liquid Crystal Display) for outputting visual information is installed in the internal space. A window 210 is formed at the central portion of the upper cover 201 to allow visual information outputted from the display module to be observed. Some function keys 220 are arranged at a lower side of the window 210 and a speaker 230 for outputting a sound is provided at an upper side thereof.

The slide module 300 is installed between the first and second bodies 100 and 200, to allow the first and second bodies 100 to be relatively slid. The slide module 300 includes a base 310 and a slider 320 slidably coupled with the base 310. The base 310 is coupled with the first body 100. For example, the base 310 can be coupled with the first body 100 by using screws (not shown) inserted into the fastening recesses 141 of the base installation part 140 of the upper cover r101. In addition, the slider 320 is coupled with the lower cover 202 of the second body 200. For example, the slider 302 can be fixed on the lower cover 202 by inserting screws (not shown) into fastening recesses 322 of the slider 320.

Figure 2:
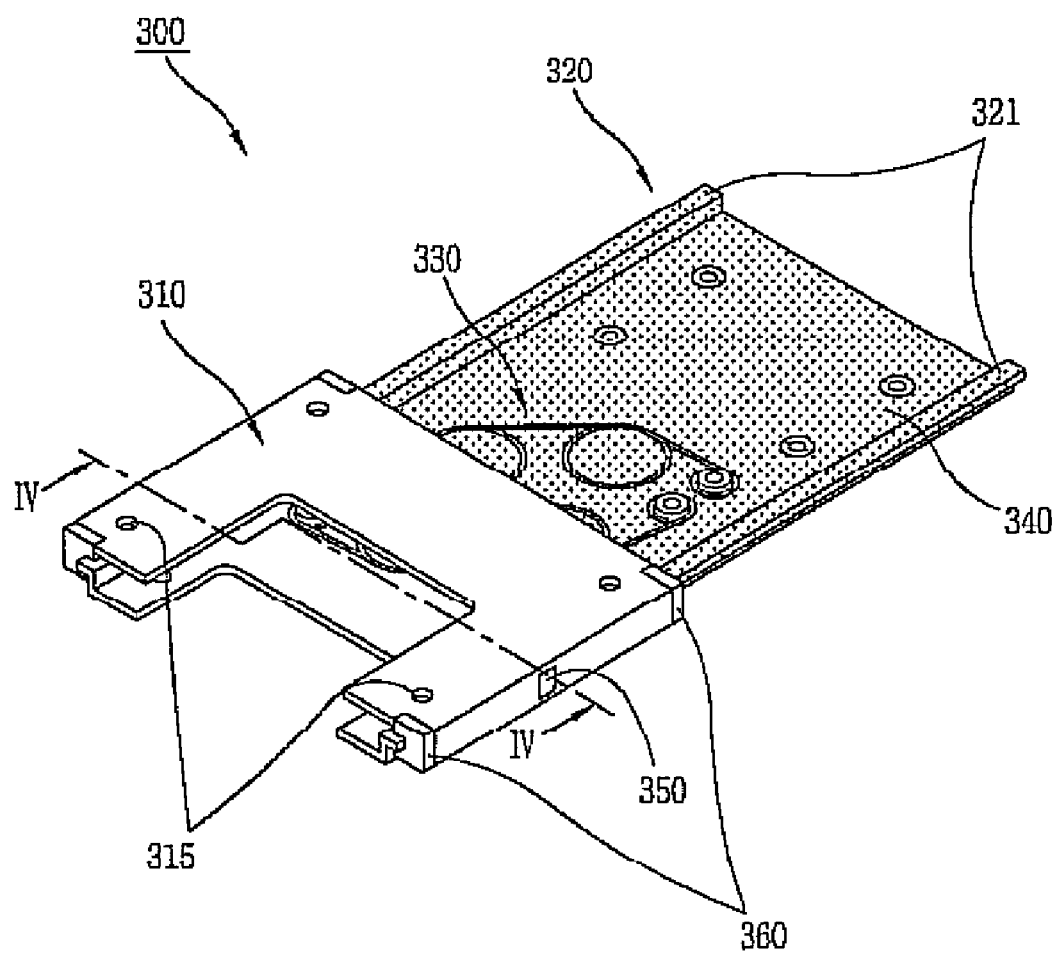
FIG. 2 is a perspective view showing a state of the slide module inside out in FIG. 1.
Figure 3:
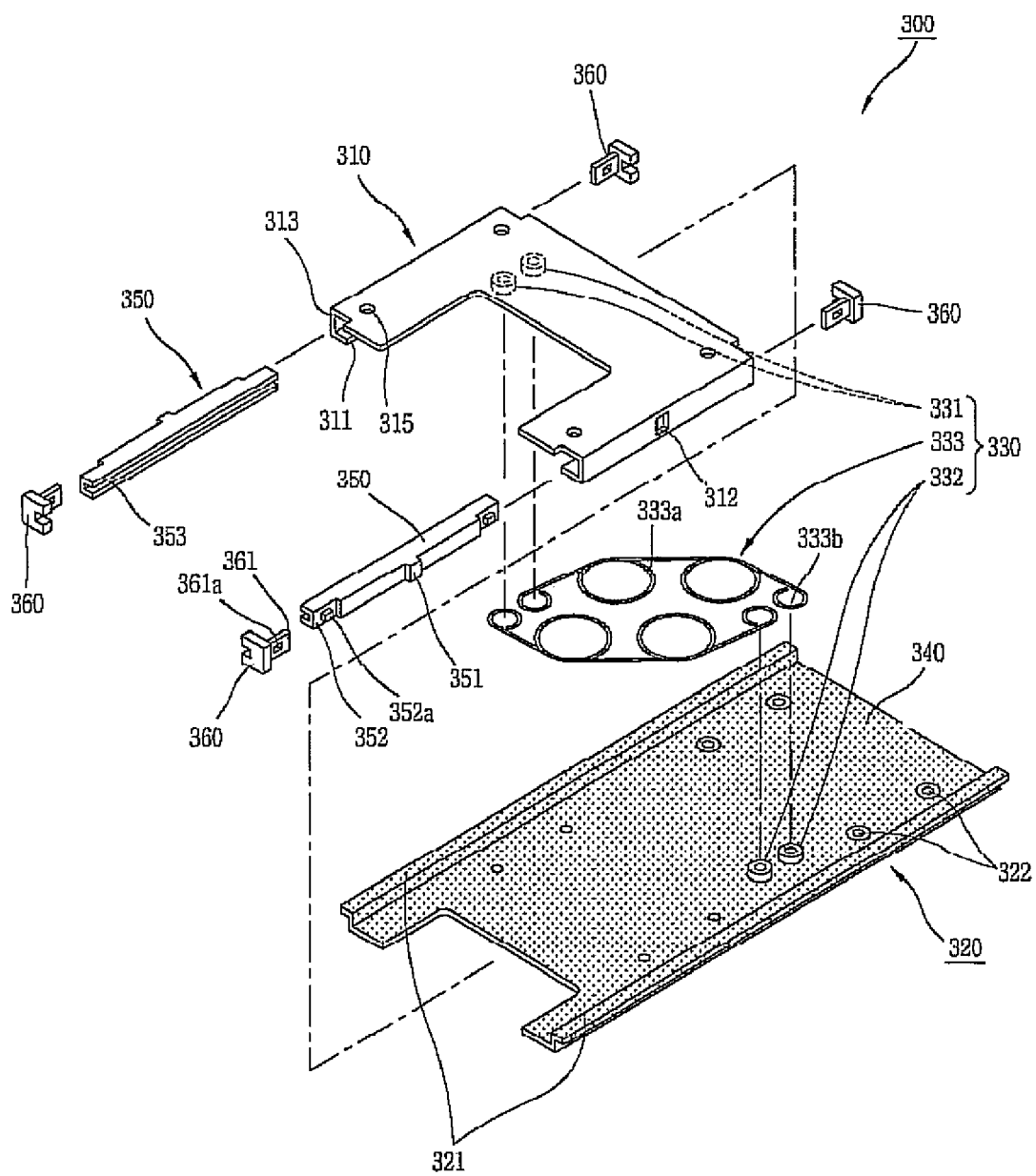
FIG. 3 is an exploded perspective view of the slide module in FIG. 2.
Figure 4:
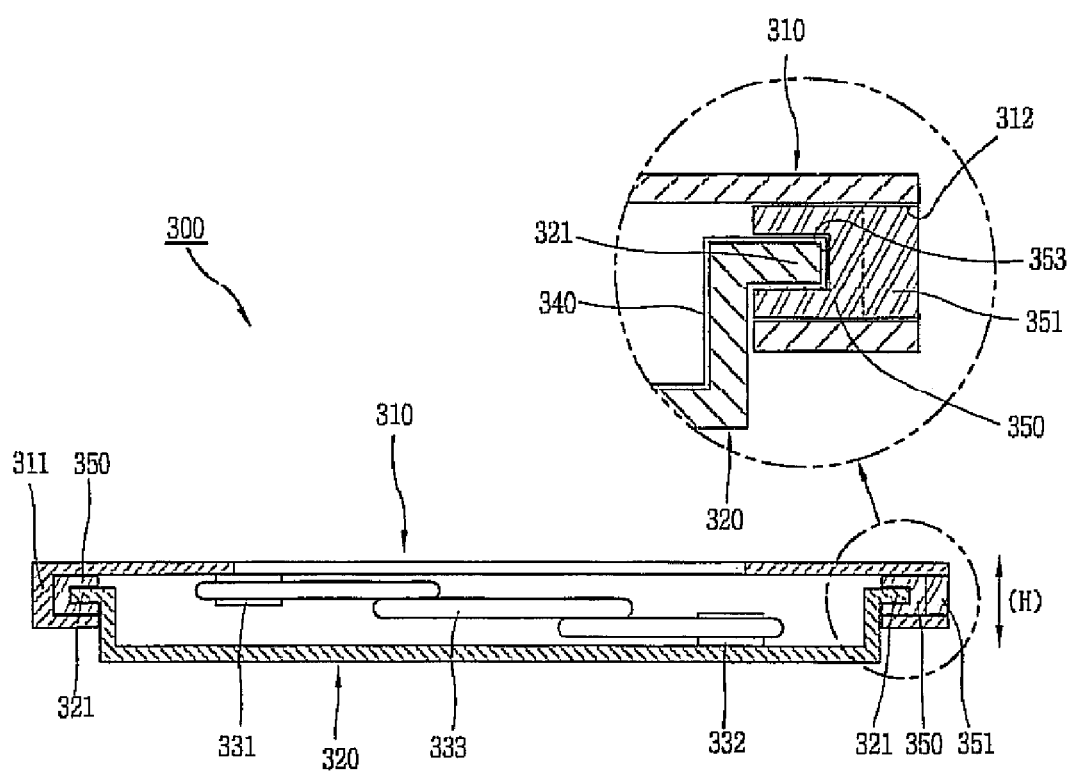
FIG. 4 is a sectional view taken along line IV-IV in FIG. 2.

FIG. 2 is a perspective view showing a state of the slide module inside out in FIG. 1, FIG. 3 is an exploded perspective view of the slide module in FIG. 2, and FIG. 4 is a sectional view taken along line IV-IV in FIG. 2.

As shown in FIGS. 2 and 3, at least one, specifically two rail receiving parts 311 are formed at both sides of the base 310 by bending an edge portion of the base 310 by two times in a sliding or lengthwise direction. At least one, specifically two Rail parts 321 are formed at both sides of the slider 320 by bending an edge portion of the slider 320 also two times, so as to be slidably inserted into the rail receiving parts 311.

The slide module 300 can further include an elastic force providing unit 330 for providing an elastic force to the sliding operation of the slider 320 with respect to the base 310. The elastic force providing unit 330 is installed between the facing surfaces of the base 310 and the slider 320 and includes a spring in a wire type.

In order to guarantee a smooth and silent sliding operation of the slide module 300 by reducing friction between the base 310 and the slider 320, between the base 310 and the elastic force providing unit 330, and between the slider 320 and the elastic force providing unit 330 according to the sliding operation of the slide module 300, the slide module 300 in the present invention includes a friction reducing unit.

In the slide module according to the first embodiment of the present invention, the friction reducing unit is a friction reducing coating layer 340 coated on the surface of the slider 320. The friction reducing coating layer 340 is formed by coating a material with a lubricating ability, and as the friction reducing coating layer 340, a material such as silicon, etc. can be used.

Direct friction between the rail receiving parts 311 of the base 310 and the rail parts 321 of the slider 320 can be lessened by means of the friction reducing coating layer 340.

With reference to FIG. 4, it can be noted that direct friction between the slider 320 and the spring 333 of the elastic force providing unit 330 can be reduced by virtue of the friction reducing coating layer 340. In addition, if the friction reducing coating layer 340 is formed on the surface of the base 310, friction between the base 310 and the spring 33 would be lessened. The surface of the spring 333 can be coated with silicon to further reduce friction with the base 310 and the slider 320 by the spring 333.

As mentioned above, because friction between the base 310 and the slider 320, between the base 310 and the elastic force providing unit 330, and between the slider 320 and the elastic force providing unit 330 is lessened by the friction reducing coating layer 340, the slide module 300 can perform more smooth and silent sliding operation.

In the slide module according to the second embodiment of the present invention, the friction reducing unit is a friction reducing member 350 mounted in the rail receiving part 311 of the base 310.

With reference to FIG. 3, the friction reducing member 350 has a bar shape extending in a lengthwise direction and insertedly mounted in the rail receiving part 311 along the lengthwise direction. A rail groove 353 is formed along the lengthwise direction on the surface contacting with the rail part 321 of the friction reducing member 350, and the rail part 321 of the slider 320 is slidably inserted in the rail groove 353 and guided at a certain height along the rail groove 353.

The friction reducing member 350 is inserted to reduce friction between the rail receiving part 311 of the base 310 and the rail part 321 of the slider 320, and preferably made of a material having a lubricating ability in itself and a certain level of strength for enduring an impact caused by friction. For this purpose, as the friction reducing member 350, engineering plastic with a lubricating ability and a certain level of strength can be used. There are many types of engineering plastic, and, for example, POM (polyoxymethylene) having the both characteristics is suitable.

The friction reducing member 350 can be coupled with the rail receiving part 311 in various manners. In one method, a coupling part can be formed by including a coupling protrusion 351 formed to be protruded from the friction reducing member 350 and a protrusion receiving recess 312 formed at the rail receiving part 311 corresponding to the coupling protrusion 351 into which the coupling protrusion 351 is inserted. By the coupling part, the friction reducing member 530 can be firmly fixed without being moved along the lengthwise direction of the rail receiving part 311. In a different method, the friction reducing member 350 can be dually injection-molded together with the base 310 so that they can be integrally formed without the necessity of being coupled together. Also, in this case, the protrusion receiving recess 312 can be previously formed at the rail receiving part 311 so that coupling of the friction reducing member 350 and the rail receiving part 311 can be firmly maintained.

With reference to FIG. 4, direct friction between the rail receiving part 311 of the base 310 and the rail part 321 of the slider 320 is changed to indirect friction. Accordingly, friction between the rail receiving part 311 of the base 310 and the rail part 311 of the slider 320 can be lessened, and thus, the slide module 300 can be more smoothly and silently operated slidably.

An end portion buffering member 360 can be additionally mounted at both end portions of the friction reducing members 350 to buffer collision between a certain member, e.g., the second body (200 in FIG. 1), where the slide module 300 is mounted and the friction reducing member 350 at the instant when the slider 320 stops sliding.

Preferably, the end portion buffering member 360 is made of a material such as rubber or urethane that is smoother than the friction reducing member 350 and can easily absorb an impact. End coupling parts for coupling the end portion buffering member 360 to the friction reducing member 350 include an end protrusion 352a formed at a portion 352 formed by cutting out the end portion of the friction reducing member 350 and an end recess 361a formed at an extended portion of the end portion buffering member 360. In other words, as the end protrusion 352a of the friction reducing member 350 is insertedly coupled with the end recess 361a of the end portion buffering member 360, the end portion buffering member 360 can be coupled with the friction reducing member 350. At this time, a cut-out portion 313 is formed at both end portions of the rail receiving part 311, to which the end portion buffering member 360 is mounted. Accordingly, the end portion buffering member 360 is slidably protruded at the corners of both end portions of the base 310.

In the slide module 300 according to the third embodiment of the present invention, the friction reducing unit is implemented by a self-construction of the elastic force providing unit 330.

With reference to FIGS. 2 and 3, the elastic force providing unit 330 includes supports 331 and 332 formed to be protruded to face each other from the main surface of the base 310 and the slider 320, and the spring 333 with both end portions supported by the supports 331 and 332.

The spring 333 is a spring in a wire type and includes a wound portion 333a for accumulating an elastic force by being wound in a closed curved form from the middle portion, namely, in a circular form, and a hook part 333b wound in a circular form and coupled to be supported by the supports 331 and 332 at both end portions.

Herein, at least two wound portions 333a are formed. The two wound portions 333a complement each other, and even when a relatively strong force is concentrated to one wound portion, its position is not inclined toward the base 310 or the slider 320. In other words, the two wound portions 333a are balanced in their force, there is a high probability that the wound portions 333a are operated only on the plane on which they are initially disposed. As a result, a possibility that the wound portions 333a are inclined toward the base 310 or the slider 320 is low.

Preferably, each wound portion 333a is wound in a closed curve form only one time. When the wound portions 333a are wound two or more times, the spring would form a multi-layer in the wound portion, and when the spring is operated, it would be fluctuated in a direction ('H' in FIG. 4) perpendicular to the main surface of the base 310 or the slider 320. However, in the present invention, the wound portion 333a of the spring 333 is wound only one time, so it cannot be fluctuated to reduce friction with the main surface of the base 310 and the slider 320. In addition, the spring 333 having the wound portion 333a wound one time is thin in its thickness in the direction 'H', the overall thickness of the slide module 300 can be slim.

The elastic force providing unit 330 is formed as a pair, and the pair of elastic force providing units 330 are facing each other and symmetrically arranged based on the central line ('C' in FIG. 5) therebetween. Such arrangement would not be inclined to one side when the spring 333 of the elastic force providing unit 330 is operated, reducing friction with the base 310 or the slider 320. At least one or more wound portions 333a are formed, and preferably, two wound portions are favored in terms of operation.

With reference to FIG. 4, since the elastic force providing unit 330 includes the spring 333 with the wound portion 332a that is wound only one time, it would not much fluctuated in the direction 'H' and thus friction with the base 310 or the slider 320 can be lessened. In addition, since the pair of elastic force providing units 330 are arranged in a about hexagonal shape, they are not inclined to one side among the base 310 and the slider 320, preventing an increase in the degree of friction. In addition, since the function of the friction reducing unit in the first and second embodiments of the present invention is achieved by the construction of the spring 333 itself, the friction reducing coating layer 340 or the friction reducing member 350 as in those embodiments is not necessary.

In the fourth embodiment of the present invention, the function of the friction reducing unit of the slide module 300 is achieved by the fact that the base 310 and the slider 320 have each different friction coefficient.

In general, friction between two contacting members is smaller in case where the two members have each different friction coefficient than in case where the two members have the same friction coefficient. Based on this principle, the base 310 and the slider 320 are made of a different material to have each different friction coefficient. Accordingly, friction between the base 310 and the slider 320 can be reduced, and accordingly, an operational noise can be also reduced.

Unlike the friction reducing unit as in the first and second embodiments of the present invention, this method is advantageous like the above-described third embodiment of the present invention in that it does not require such an additional construction of the friction reducing coating layer 340 and the friction reducing member 350.

Figure 5:
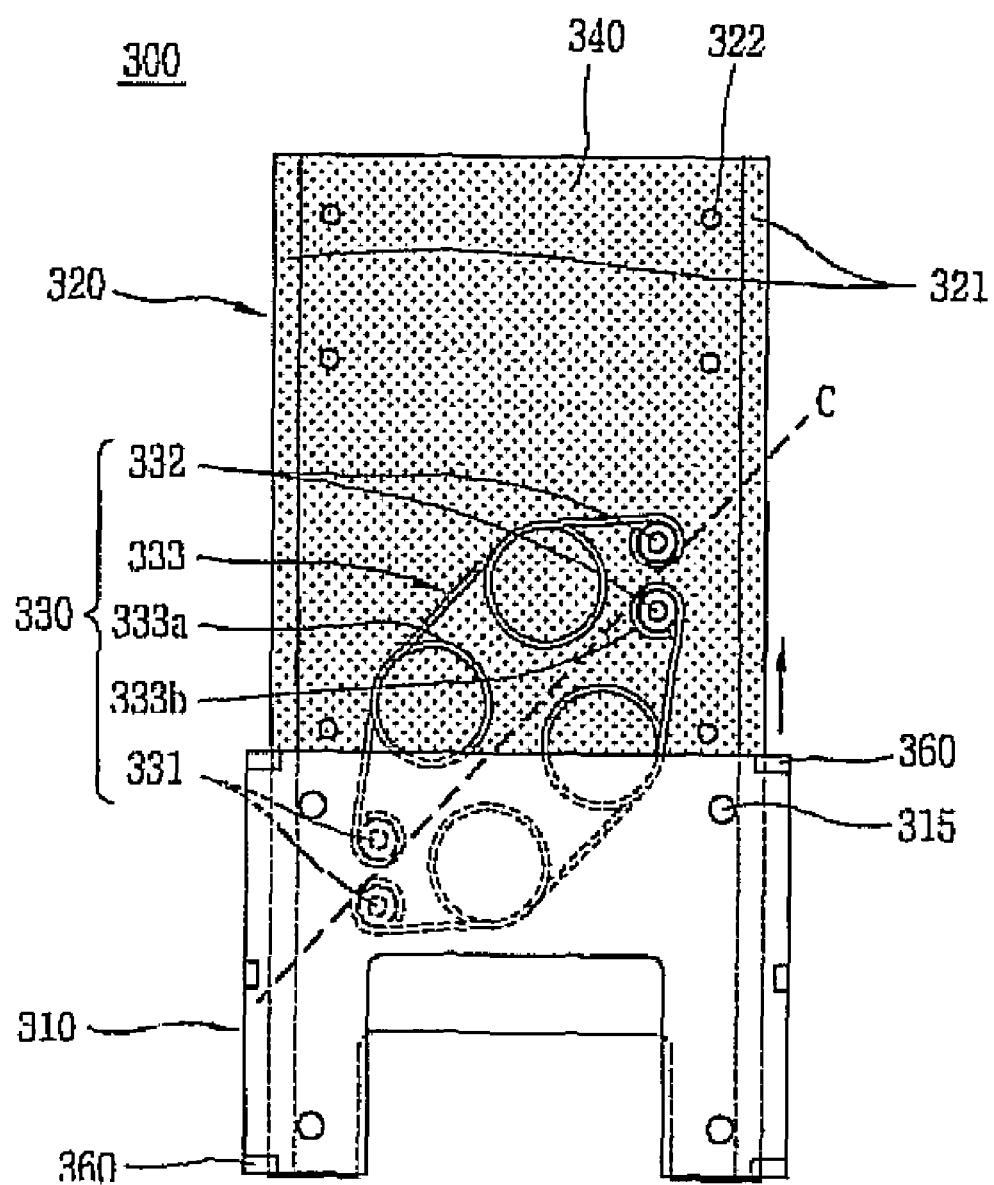
FIGS. 5 and 6 show the relative position relation according to a sliding operation between a base and a slider.
Figure 6:
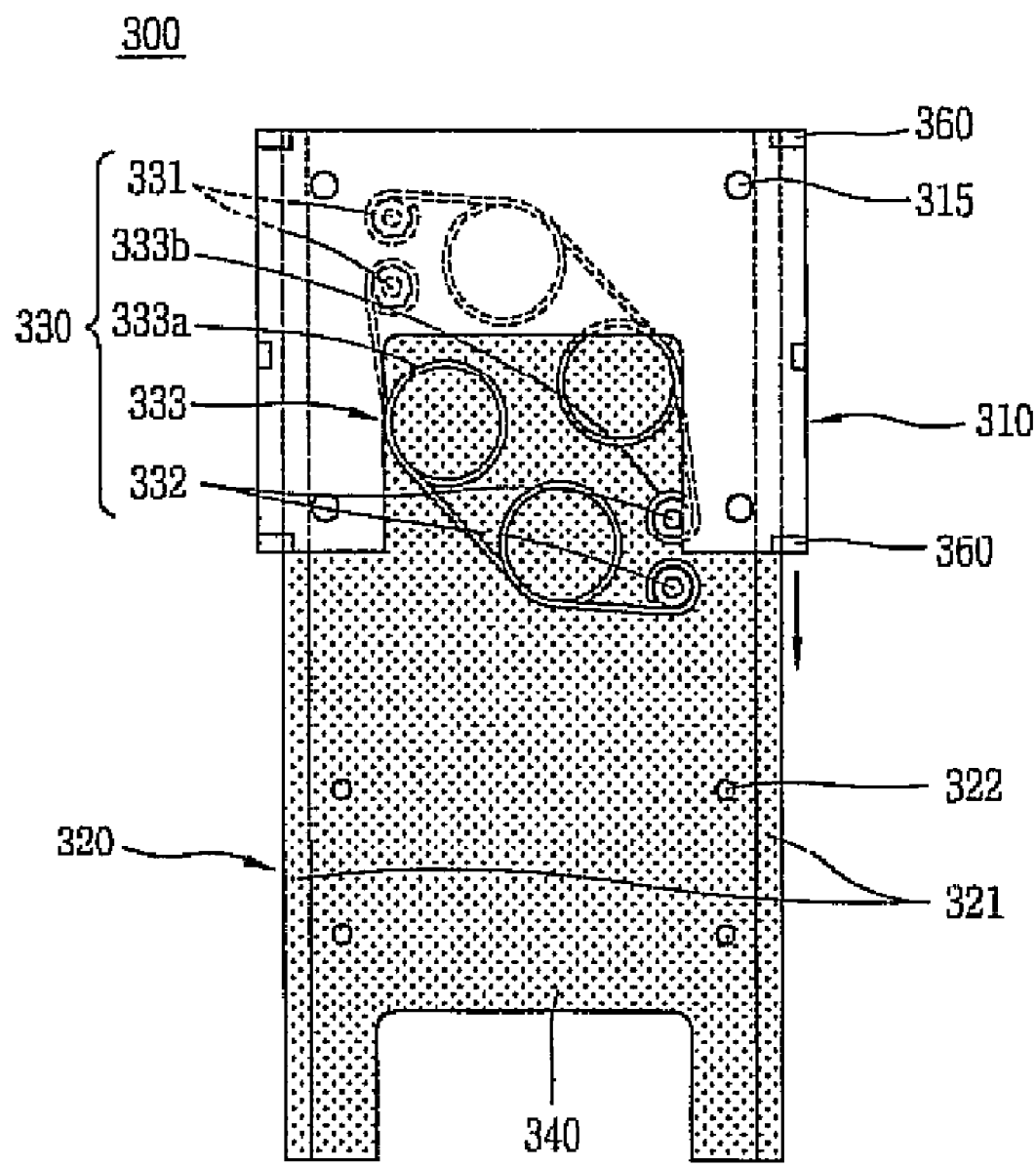

FIGS. 5 and 6 show the relative position relation according to a sliding operation between a base and a slider. Specifically, FIG. 5 shows a state that the slider 320 is moved up over the base 310 and FIG. 6 shows a state that the slider 320 is moved down over the base 310.

When the sliding operation is performed between the base 310 and the slider 320 (as shown in FIGS. 5 and 6), as described above with reference to the embodiments, owing to one operation or their composite operation of the friction reducing units (the construction of the friction reducing coating layer 340, the friction reducing member 350 and the elastic force providing unit 330, and the material of the base 310 and the slider 320) to lessen friction, the relative sliding between the two positions can be more smoothly and silently performed.

The construction for achieving the function of the friction reducing unit with respect to the coupling relation between the slide module and the second body in the mobile terminal according to another aspect of the present invention will be described.

Figure 7:
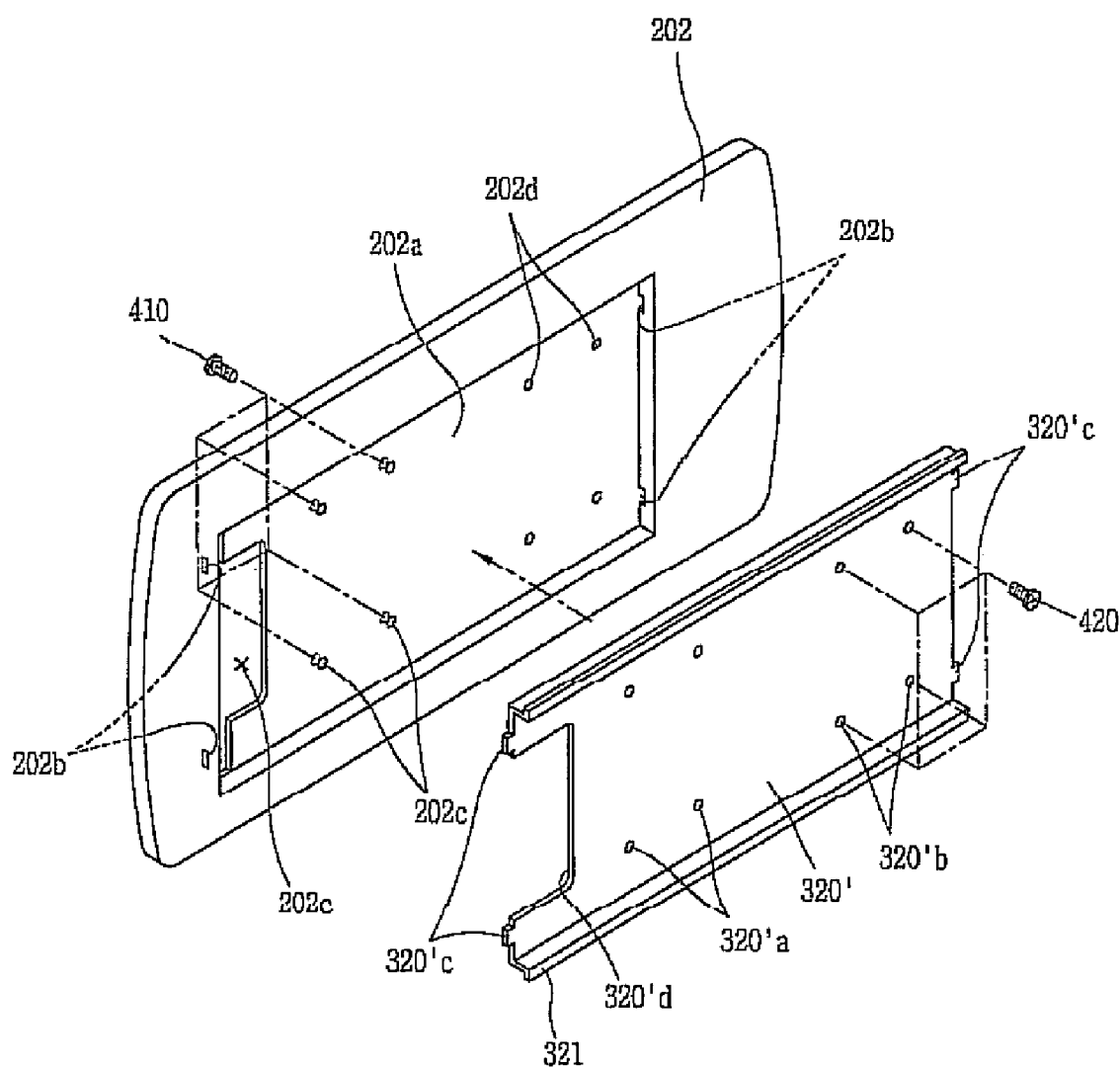
FIG. 7 is an exploded perspective view for explaining a coupling method between a second body and the slider of the mobile terminal in FIG. 1.
Figure 8:
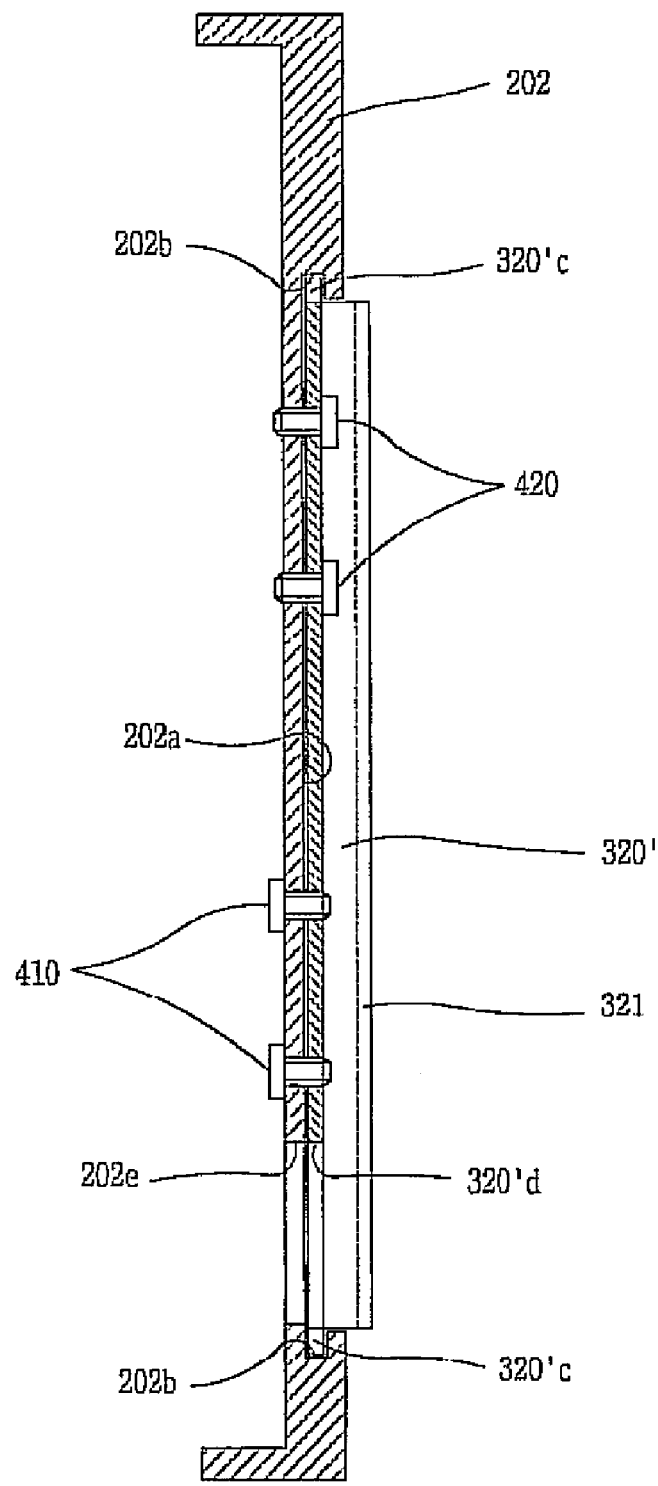
FIG. 8 is a side view showing a coupling state in FIG. 7.

FIG. 7 is an exploded perspective view for explaining a coupling method between a second body and the slider of the mobile terminal in FIG. 1, and FIG. 8 is a side view showing a coupling state in FIG. 7.

In FIGS. 7 and 8, the same construction as in the above-mentioned drawings are omitted or the same reference numerals are given to the same elements.

With reference to FIGS. 7 and 8, a slider installation part 202a is formed on the lower cover 202 of the second body 200, on which a slider 320' is installed. The slider installation part 202a has a lower height than other portions of the lower cover 202 to receive the slider 320'. The slider installation part 202a and the slider 320' include cut-out portions 202e and 320'd, respectively, through which a signal cable (not shown) between the first and second bodies 100 and 200 can be connected.

Herein, if the lower cover 202 and the slider cover 320' are completely coupled, not allowing any separation therebetween, the slider 320' would not be fluctuated and thus no collision (or friction) would occur. Thus, for this purpose, a fixing part can be formed between the slider 320' and the lower cover 202.

In the mobile terminal according to one embodiment of the present invention, the fixing part includes fixing protrusions 320'c protruded from both end portions of the slider 320' and fixing recesses 202b formed at the lower cover 202 corresponding to the fixing protrusions 320'c. Preferably, the fixing protrusions 320'c and the fixing recesses 202b are formed at the both end portions in the lengthwise direction of the slider 320' and the lower cover 202. The reason is because since the slider 320' is formed to extend in the lengthwise direction, there is a relatively high possibility that the slider 320' is separated at the both end portions in the lengthwise direction from the lower cover 202.

When the slider 320' is pressed toward the slider installation part 202a, the fixing protrusions 320'c are pushed to be inserted into the fixing recesses 202b. Accordingly, the fixing protrusions 320'c and the fixing recesses 202b can be simply coupled according to a snap-fit method.

The coupling method between the slider 320' and the lower cover 202 is advantageous in that the coupling process is simple and the slider 320' cannot be separated from the lower cover 202. Accordingly, collision, friction or a noise that may be generated as the slider 320' is not properly fixed on the lower cover 202 during the sliding operation of the slide module 300 can be lessened, and thus, a smooth and silent operation of the slide module 300 can be guaranteed. In addition, because the first coupling between the slide 320' and the lower cover 202 is completed by the simple coupling method, when the second coupling is performed by using the screw, etc., the slider 320' and the lower cover 202 can be simultaneously aligned advantageously.

In the mobile terminal according to another embodiment of the present invention, the fixing part includes a first fastening unit fastened from the side of the lower cover 202 toward the slider 320' and a second fastening unit fastened in the opposite direction to that of the first fastening unit.

The first fastening unit includes first fastening recesses 202c and 320' formed on the lower cover 202 and the slider 320', respectively, and a first fastening member 410 such as a screw threaded into the first fastening recesses 202c and 320'a in a direction from the lower cover 202 to the slider 320'.

The second fastening unit includes the second fastening recesses 202d and 320'b formed on the lower cover 202 and the slider 320', respectively, and a second fastening member 420 such as a screw threaded into the second fastening recesses 202d and 320'b in a direction from the slider 320' to the lower cover 202.

Because the first and second fastening units fasten the lower cover 202 and the slider 320' in the opposite directions, the slider 320' and the lower cover 202 can be more firmly combined and maintained for a long time, compared with a case where the lower cover 202 and the slider 320' are fastened in the same direction. Accordingly, since the slider 32' is properly fixed on the lower cover 202, it is guaranteed that the slide module 300 is smoothly and silently operated.

In the above descriptions, the rail receiving parts 311 are formed at the base 310 and the rail parts 321 are formed at the sliders 320 and 320', but the opposite construction can be possible. Also, the base 310 is coupled with the first body 100 and the sliders 320 and 320' are coupled with the second body 200, but the opposite coupling can be also possible.

The foregoing embodiments and advantages are merely exemplary and are not to be construed as limiting the present invention. Many alternatives, modifications, and variations will be apparent to those skilled in the art. For example, the invention is explained based on a slide type mobile terminal, it can be also applied to a swing type mobile terminal. Because two types of a mobile terminal are same in that one body is slidably moved over another body with facing each other. Only the slide type terminal is moved in line, but the swing type terminal is moved in arc.

In the claims, means-plus-function clauses are intended to cover the structure described herein as performing the recited function and not only structural equivalents but also equivalent structures.

What is claimed is:

1. A mobile terminal comprising:
a first body;
a second body; and
a slide module configured to slide the second body over the first body along a sliding direction between the first body and the second body,
wherein the slide module comprises:
a base mounted on one of the first and second bodies and including at least one rail receiving part comprising a recess or hole;
a slider mounted on another of the first and second bodies and including at least one rail part facing the base; and
a friction reducing unit formed on at least one of the base and the slider to reduce friction generated when the slider is slidably moved on the base, wherein the friction reducing unit comprises:
a friction reducing member having a bar-type shape and extendedly formed in the sliding direction, the friction reducing member having:
a rail groove formed on a first side along the sliding direction; and
a protrusion protruded from a surface of a second side,
wherein the protrusion of the friction reducing member is inserted into the recess or hole of the at least one rail receiving part such that the friction reducing member is insertedly mounted in the at least one rail receiving part and the at least one rail part is slidably inserted into the rail groove of the friction reducing member; and
buffer members formed at both end portions of the friction reducing member and configured to be mounted to both end portions of the at least one rail receiving part such that the friction reducing member is stably disposed and not moved in the sliding direction within the at least one rail receiving part, wherein each buffer member has a rail groove formed along the sliding direction such that the at least one rail part is inserted into both the rail groove of the friction reducing member and the rail groove of the buffer member that are aligned in the sliding direction,
wherein the protrusion of the friction reducing member is inserted into the recess or hole of the at least one rail receiving part in a direction that is perpendicular to the sliding direction.

2. The mobile terminal of claim 1, further comprising:
an input unit arranged on the first body; and
a display module mounted on the second body,
wherein the input unit is exposed when the second body is moved slidably over the first body.

3. The mobile terminal of claim 1, wherein the hole of the at least one rail receiving part is a through-hole and the friction reducing member is coupled to the at least one rail receiving part by insertion of the protrusion into the through-hole.

4. The mobile terminal of claim 1, wherein the friction surface of the second side of the friction reducing member is in contact with the at least one rail receiving part of the base and a surface of the first side of the friction reducing member is in contact with the at least one rail part of the slider.

5. The mobile terminal of claim 1, wherein the friction reducing member is made of a material having a lubricating ability.

6. The mobile terminal of claim 5, wherein the material comprises an engineering plastic.

7. The mobile terminal of claim 6, wherein the engineering plastic comprises polyoxymethylene (POM).

8. The mobile terminal of claim 1, wherein the base comprises two rail receiving parts including a first receiving part and a second receiving part, the slider comprises two rail parts including a first rail part and a second rail part, and the friction reducing unit comprises two friction reducing members including a first friction reducing member and a second friction reducing member, and wherein the first friction reducing member is inserted into the first rail receiving part and the first rail part is inserted into a first rail groove of the first friction reducing member, and the second reducing member is inserted into the second rail receiving part and the second rail part is inserted into a second rail groove of the second friction reducing member.

9. The mobile terminal of claim 1, wherein the friction reducing unit further comprises a friction reducing coating layer coated on a surface of the slider, the friction reducing coating layer formed by coating the surface of the slider with a lubricating material.

10. The mobile terminal of claim 9, wherein the lubricating material comprises silicon.

11. The mobile terminal of claim 1, wherein the buffer members are individually formed at each end portion of the friction reducing member and positioned at each end portion of the at least one rail receiving part.

12. The mobile terminal of claim 1, wherein the slide module further comprises an elastic force providing unit coupled with the base and the slider, wherein the elastic force providing unit comprises a pair of springs to provide elastic counter balance to allow the first body and the second body to maintain their respective positions, and each of the pair of springs comprising at least two single loops, each of the at least two single loops wound in a closed curve form once and not overlapping, to minimize thickness of the at least one spring when disposed between the slide base and the slider, wherein first ends of the pair of springs are coupled to the slide base and second ends of the pair of springs are coupled to the slider.

13. The mobile terminal of claim 12, wherein each of the first and second ends comprises a hook part wound in a circular form and the base and the slider comprise supports formed on respective surfaces of the base and the slider, and wherein the supports, which are protruded from the surfaces of the base and the slider, are configured to receive corresponding hook parts of the first and second ends of the pair of springs by being inserted into the corresponding hook parts.

14. The mobile terminal of claim 1, wherein the at least one rail receiving part comprises the hole.

15. A mobile terminal comprising:
a first body;
a second body; and
a slide module configured to slide the second body over the first body along a sliding direction between the first body and the second body,
wherein the slide module comprises:
    a base mounted on one of the first and second bodies and including at least one rail receiving part;
    a slider mounted on another of the first and second bodies and including at least one rail part slidably inserted into the rail receiving part;
    an elastic force providing unit which comprises a pair of supports protrusively formed on facing surfaces of the base and the slider and a spring, whose both end portions are supported by the pair of supports, having at least two wound portions wound in a closed curve line form between the both end portions to provide an elastic force to the sliding;
    a friction reducing member having a bar-type shape and extendedly formed in the sliding direction, the friction reducing member having:
        a rail groove formed on a first side along the sliding direction; and
        a protrusion protruded from a surface of a second side,
    wherein the protrusion of the friction reducing member is inserted into the recess or hole of the at least one rail receiving part such that the friction reducing member is insertedly mounted in the at least one rail receiving part and the at least one rail part is slidably inserted into the rail groove of the friction reducing member; and
    buffer members formed at both end portions of the friction reducing member and configured to be mounted to both end portions of the at least one rail receiving part such that the friction reducing member is stably disposed and not moved in the sliding direction within the at least one rail receiving part, wherein each buffer member has a rail groove formed along the sliding direction such that the at least one rail part is inserted into both the rail groove of the friction reducing member and the rail groove of the buffer member that are aligned in the sliding direction,
    wherein the protrusion of the friction reducing member is inserted into the recess or hole of the at least one rail receiving part in a direction that is perpendicular to the sliding direction.

16. The mobile terminal of claim 15, further comprising:
an input unit arranged on the first body; and
a display module mounted on the second body,
wherein the input unit is exposed when the second body is moved slidably over the first body.

17. The mobile terminal of claim 15, wherein the at least one rail receiving part comprises the hole.

18. A mobile terminal comprising:
a first body;
a second body; and
a slide module configured to slide the second body over the first body along a sliding direction between the first body and the second body,
wherein the slide module comprises:
    a base mounted on one of the first and second bodies and including at least one rail receiving part;
    a slider mounted on another of the first and second bodies and including at least one rail part slidably inserted into the rail receiving part, wherein the base and the slider are made of materials having different friction coefficients;
    a friction reducing member having a bar-type shape and extendedly formed in the sliding direction, the friction reducing member having:
        a rail groove formed on a first side along the sliding direction; and
        a protrusion protruded from a surface of a second side,
    wherein the protrusion of the friction reducing member is inserted into the recess or hole of the at least one rail receiving part such that the friction reducing member is insertedly mounted in the at least one rail receiving part and the at least one rail part is slidably inserted into the rail groove of the friction reducing member; and
    buffer members formed at both end portions of the friction reducing member and configured to be mounted to both end portions of the at least one rail receiving part such that the friction reducing member is stably disposed and not moved in the sliding direction within the at least one rail receiving part, wherein each buffer member has a rail groove formed along the sliding direction such that the at least one rail part is inserted into both the rail groove of the friction reducing member and the rail groove of the buffer member that are aligned in the sliding direction,
    wherein the protrusion of the friction reducing member is inserted into the recess or hole of the at least one rail receiving part in a direction that is perpendicular to the sliding direction.

19. The mobile terminal of claim 18, further comprising:
an input unit arranged on the first body; and
a display module mounted on the second body,
wherein the input unit is exposed when the second body is moved slidably over the first body.

20. The mobile terminal of claim 18, wherein the buffer members are individually formed at each end portion of the friction reducing member and protruded at the friction reducing member in a direction orthogonal to a plane of a sliding movement of the first and second bodies and are positioned at each end portion of the at least one rail receiving part.

21. The mobile terminal of claim 18, wherein the at least one rail receiving part comprises the hole.

22. A mobile terminal for processing and displaying information, the mobile terminal comprising:
a first body having a front portion configured to provide a user interface;
a second body electronically connected to the first body to communicate data; and
a slide module configured to couple the first body and the second body to provide a bi-directional sliding movement of the first and second bodies, the bi-directional sliding movement generating a first operating position associated with a first operating mode and a second operating position associated with a second operating mode of the mobile terminal depending on relative positions of the first and second bodies,
wherein the slide module comprises:
a slide base and a slider that are slidably engaged with respect to each other using at least one rail system to provide the bi-directional sliding movement, the slide base comprising a recess or a hole; and
a friction reducing unit having a bar-type shape, the friction reducing unit comprising:
a rail groove that is insertedly disposed in the slide base along at least a part of a length of the slide base to slidably engage a rail extending along a length of the slider;
a protrusion protruded from a surface of a side of the friction reducing unit; and
buffer members individually formed at each end of the rail groove to reduce impact when sliding between the first and second operating positions and having a groove formed along a sliding direction of the first and second bodies, wherein the rail is movably inserted in the rail groove and the groove of the buffer members that are aligned in the sliding direction,
wherein the protrusion is inserted into the recess or hole of the slide base in a direction that is perpendicular to the sliding direction.

23. The mobile terminal of claim 22, wherein the slide base is coupled to the first body and the slider is coupled to the second body to provide the bi-directional sliding movement.

24. The mobile terminal of claim 22, wherein the user interface comprises at least one of a display for providing image data and at least one key for receiving a user input.

25. The mobile terminal of claim 22, wherein the slide module further comprises an elastic force providing unit coupled with the slide base and the slider, wherein the elastic force providing unit comprises at least one spring to provide elastic counter balance to allow the first body and the second body to maintain one of the first and second operating positions, and the at least one spring comprising at least one single loop to minimize thickness of the at least one spring when disposed between the slide base and the slider, wherein a first end of the at least one spring is coupled to the slide base and a second end of the at least one spring is coupled to the slider.

26. The mobile terminal of claim 25, wherein the elastic force providing unit comprises at least two springs substantially aligned with each other to provide the elastic counter balance.

27. The mobile terminal of claim 25, wherein the at least one spring is coated with a material having a low friction coefficient.

28. The mobile terminal of claim 25, wherein each of the at least one spring comprises a plurality of single loops disposed along a length of the at least one spring and the plurality of single loops do not overlap.

29. The mobile terminal of claim 22, wherein the slide base comprises the hole.

30. A mobile terminal for processing and displaying information, the mobile terminal comprising:
a first body having a front portion configured to provide a user interface;
a second body electronically connected to the first body to communicate data; and
a slide module configured to couple the first body and the second body to provide a bi-directional sliding movement of the first and second bodies, the sliding movement generating a first operating position associated with a first operating mode and a second operating position associated with a second operating mode of the mobile terminal depending on relative positions of the first and second bodies,
wherein the slide module comprises:
a slide base mounted on one of the first and second bodies and including at least one rail receiving part comprising a recess or hole;
a slider mounted on another of the first and second bodies and including at least one rail part facing the slide base; and
a friction reducing unit formed on at least one of the slide base and the slider to reduce friction generated when the slider is slidably moved on the slide base,
wherein the friction reducing unit comprises:
a friction reducing member having a bar-type shape and extendedly formed in the sliding direction, the friction reduction member having:
a rail groove formed on a first side along the sliding direction and
a protrusion protruded from a surface of a second side,
wherein the protrusion of the friction reducing member is inserted into the recess or hole of the at least one rail receiving part such that the friction reducing member is insertedly mounted in the at least one rail receiving part and the at least one rail part is slidably inserted into the rail groove of the friction reducing member; and
buffer members formed at both end portions of the friction reducing member and configured to be mounted to both end portions of the at least one rail receiving part such that the friction reducing member is stably disposed and not moved in the sliding direction within the at least one rail receiving part, wherein each buffer member has a rail groove formed along the sliding direction such that the at least one rail part is inserted into both the rail groove of the friction reducing member and the rail groove of the buffer member that are aligned in the sliding direction,
wherein the protrusion of the friction reducing member is inserted into the recess or hole of the at least one rail receiving part in a direction that is perpendicular to the sliding direction.

31. The mobile terminal of claim 30, wherein the slide base and the slider are made of materials having different friction coefficients.

32. The mobile terminal of claim 30, wherein at least one of the slide base and the slider comprises a coating having a friction coefficient that is different from a friction coefficient of another of the base and the slider.

33. The mobile terminal of claim 30, wherein the slide base is coupled to the first body and the slider is coupled to the second body to provide the bi-directional sliding movement.

34. The mobile terminal of claim 30, wherein the user interface comprises at least one of a display for providing image data and at least one key for receiving a user input.

35. The mobile terminal of claim 30, wherein the slide module further comprises an elastic force providing unit coupled with the slide base and the slider, wherein the elastic force providing unit comprises at least one spring disposed to provide elastic counter balance to allow the first body and the second body to maintain one of the first and second operating positions, and the at least one spring comprising at least one single loop to minimize thickness of the at least one spring when disposed between the slide base and the slider, wherein a first end of the at least one spring is coupled to the slide base and a second end of the at least one spring is coupled to the slider.

36. The mobile terminal of claim 35, wherein the elastic force providing unit comprises at least two springs substantially aligned with each other to provide the elastic counter balance.

37. The mobile terminal of claim 35, wherein the at least one spring is coated with a material having a low friction coefficient.

38. The mobile terminal of claim 35, wherein each of the at least one spring comprises a plurality of single loops disposed along a length of the at least one spring and the plurality of single loops do not overlap.

39. A method for operating a mobile terminal, the method comprising:
  providing a first body having a front portion configured to provide a user interface;
  connecting a second body to the first body to enable communication of data; and
  coupling the first body and the second body using a slide module to provide a bi-directional sliding movement of the first and second bodies, the bi-directional sliding movement generating a first operating position associated with a first operating mode and a second operating position associated with a second operating mode of the mobile terminal depending on relative positions of the first and second bodies,
  wherein the slide module comprises:
    a slide base and a slider slidably engaging each other using at least one rail system to provide the bi-directional sliding movement, the slide base including at least one rail receiving part comprising a recess or hole and the slider including at least one rail part facing the slide base; and
    a friction reducing unit comprising a rail groove and disposed in the slide base along at least a part of a length of the slide base to slidably engage a rail extending along a length of the slider,
  wherein the friction reducing unit further comprises;
    a friction reducing member having a bar-type shape and extendedly formed in a sliding direction, the friction reducing member having:
      a rail groove formed on a first side along the sliding direction; and
      a protrusion protruded from a surface of a second side,
    wherein the protrusion of the friction reducing member is inserted into the recess or hole of the at least one rail receiving part such that the friction reducing member is insertedly mounted in the at least one rail receiving part and the at least one rail part is slidably inserted into the rail groove of the friction reducing member; and
    buffer members formed at both end portions of the friction reducing member and configured to be mounted to both end portions of the at least one rail receiving part such that the friction reducing member is stably disposed and not moved in the sliding direction within the at least one rail receiving part, wherein each buffer member has a rail groove formed along the sliding direction such that the at least one rail part is inserted into both the rail groove of the friction reducing member and the rail groove of the buffer member that are aligned in the sliding direction,
  wherein the protrusion of the friction reducing member is inserted into the recess or hole of the at least one rail receiving part in a direction that is perpendicular to the sliding direction.

40. The method of claim 39, further comprising:
  coupling the slide base to the first body and coupling the slider to the second body to provide the bi-directional sliding movement.

41. The method of claim 39, wherein the slide module further comprises an elastic force providing unit coupled with the slide base and the slider, wherein the elastic force providing unit comprises at least one spring disposed to provide elastic counter balance to allow the first body and the second body to maintain one of the first and second operating positions, and the at least one spring comprising at least one single loop to minimize thickness of the at least one spring when disposed between the slide base and the slider, wherein a first end of the at least one spring is coupled to the slide base and a second end of the at least one spring is coupled to the slider.

42. The method of claim 41, wherein the elastic force providing unit comprises at least two springs substantially aligned with each other to provide the elastic counter balance.

43. The method of claim 41, wherein the at least one spring is coated with a material having a low friction coefficient.

44. The method of claim 41, wherein each of the at least one spring comprises a plurality of single loops disposed along a length of the at least one spring and the plurality of single loops do not overlap.

45. A method for operating a mobile terminal, the method comprising:
  providing a first body having a front portion configured to provide a user interface;
  connecting a second body to the first body to enable communication of data; and
  coupling the first body and the second body using a slide module to provide a bi-directional sliding movement of the first and second bodies, the bi-directional sliding movement generating a first operating position associated with a first operating mode and a second operating position associated with a second operating mode of the mobile terminal depending on relative positions of the first and second bodies,
  wherein the slide module comprises:
    a slide base mounted on one of the first and second bodies and including at least one rail receiving part comprising a recess or hole;
    a slider mounted on another of the first and second bodies and including at least one rail part facing the slide base;
    a friction reducing member
    having a bar-type shape, and extendedly formed in a sliding direction, the friction reducing member having:

a rail groove formed along the sliding direction, is insertedly mounted in the slide base such that a rail is slidably inserted into the rail groove of the friction reducing member; and a protrusion protruded from a surface of a second side, wherein the protrusion of the friction reducing member is inserted into the recess or hole of the at least one rail receiving part such that the friction reducing member is insertedly mounted in the at least one rail receiving part and the at least one rail part is slidably inserted into the rail groove of the friction reducing member; and buffer members formed at both end portions of the friction reducing member and configured to be mounted to both end portions of the at least one rail receiving part such that the friction reducing member is stably disposed and not moved in the sliding direction within the at least one rail receiving part, wherein each buffer member has a rail groove formed along the sliding direction such that the at least one rail part is inserted into both the rail groove of the friction reducing member and the rail groove of the buffer member that are aligned in the sliding direction, wherein the protrusion of the friction reducing member is inserted into the recess or hole of the at least one rail receiving part in a direction that is perpendicular to the sliding direction.

46. The method of claim 45, wherein the slide base and the slider are made with materials having different friction coefficients.

47. The method of claim 45, wherein at least one of the slide base and the slider comprises a coating having a low friction coefficient.

48. The method of claim 45, wherein the slide base is coupled to the first body and the slider is coupled to the second body to provide the bi-directional sliding movement.

49. The method of claim 45, wherein the user interface comprises at least one of a display for providing image data and at least one key for receiving a user input.

* * * * *